Dec. 31, 1929.  K. E. LYMAN ET AL  1,741,861
AUTOMATIC TRANSMISSION
Filed July 30, 1928   3 Sheets-Sheet 3
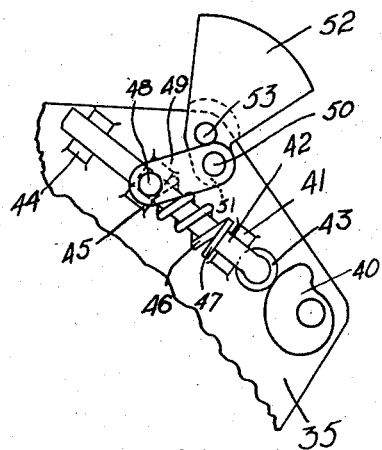
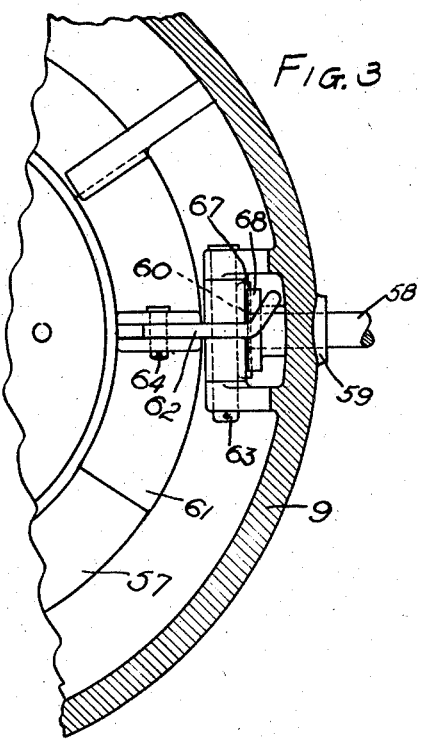
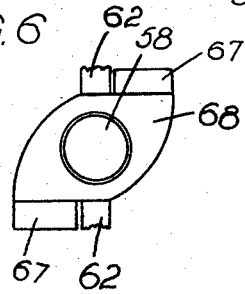
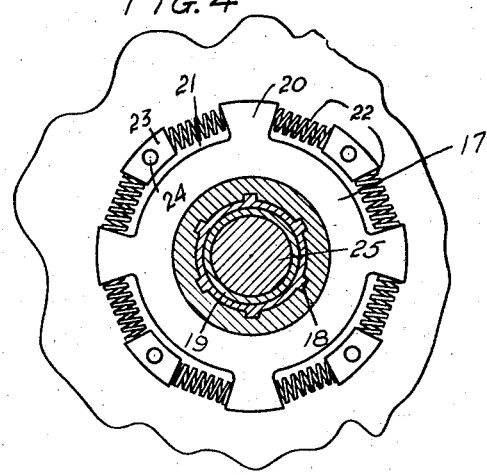
INVENTOR.
KENNETH E. LYMAN
BY ALBERT M. LANE
ATTORNEY.

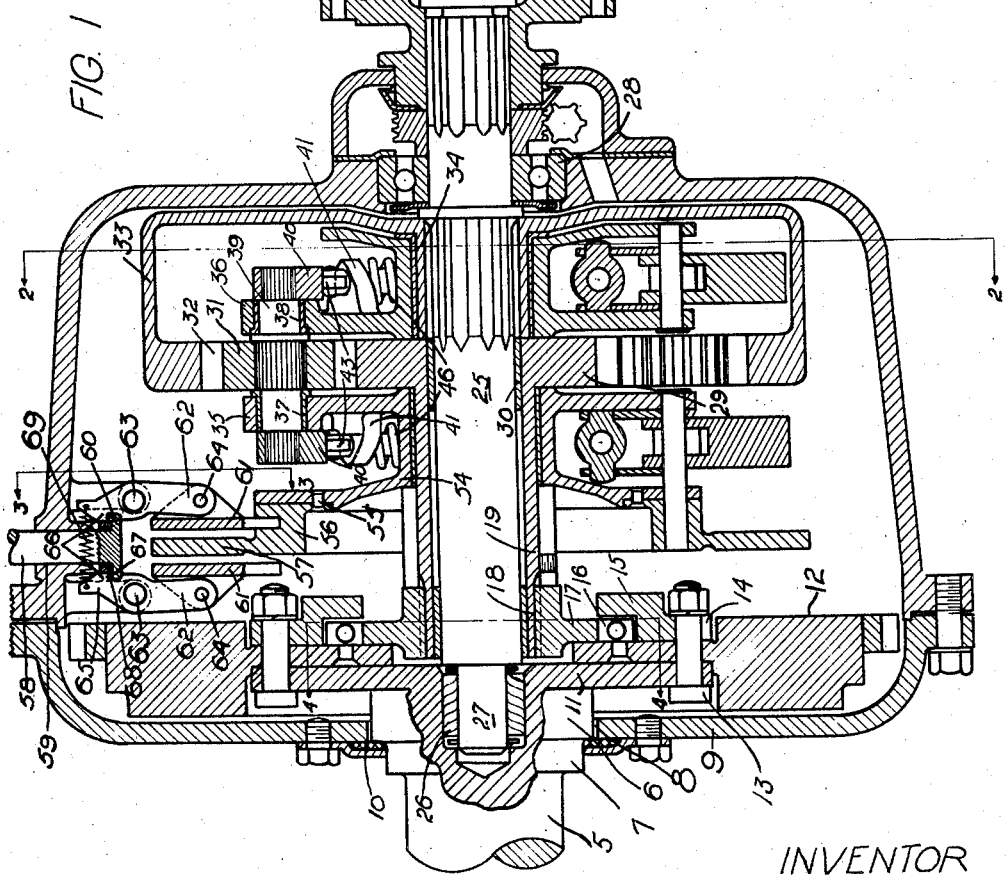

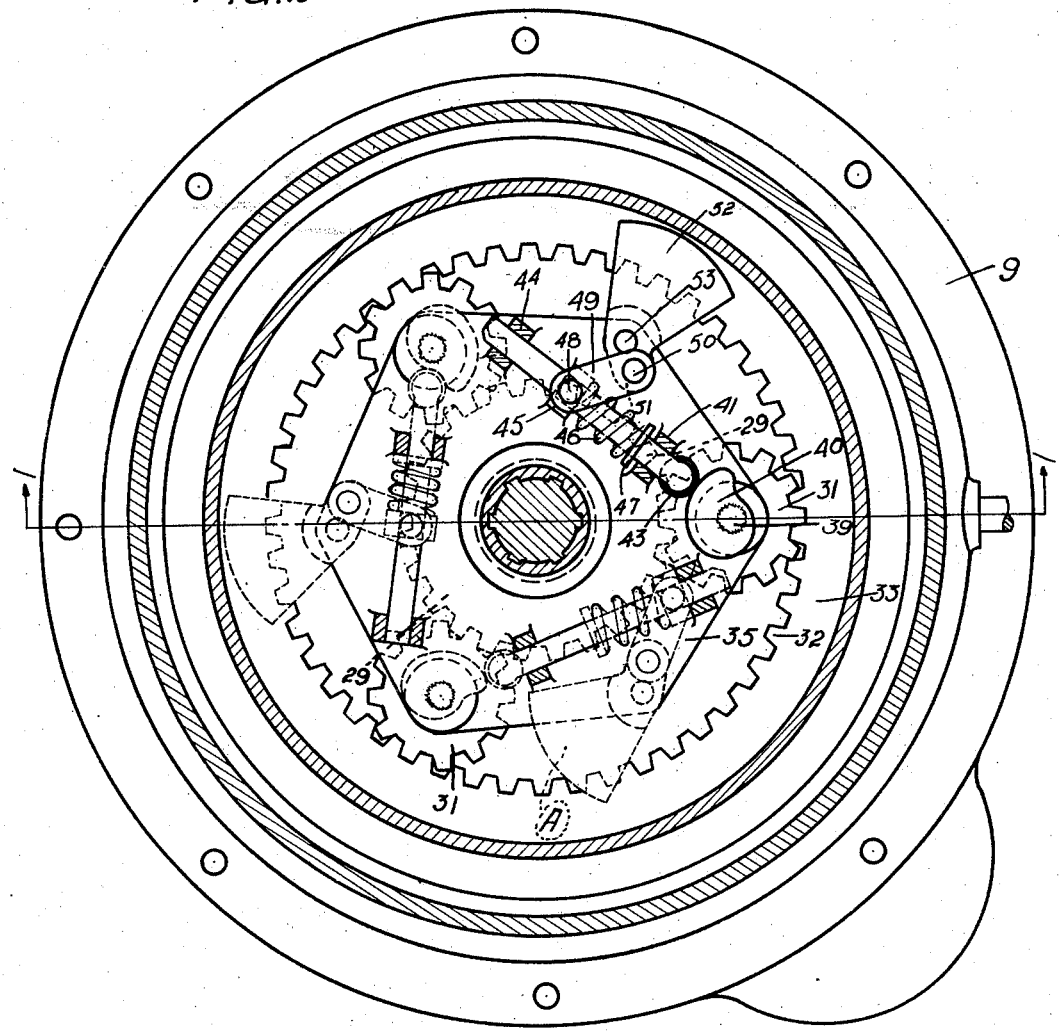

Patented Dec. 31, 1929

1,741,861

UNITED STATES PATENT OFFICE

KENNETH E. LYMAN AND ALBERT M. LANE, OF ROCKFORD, ILLINOIS, ASSIGNORS TO AUTOMATIC TRANSMISSION COMPANY, OF ROCKFORD, ILLINOIS, A CORPORATION OF ILLINOIS

AUTOMATIC TRANSMISSION

Application filed July 30, 1928. Serial No. 296,156.

The present invention relates in general to power transmitting mechanisms and has particular reference to an improved automatic transmission which is especially adaptable for use in connection with motor driven vehicles.

The principal object of the invention resides in the provision of a mechanism of the character described which is capable of establishing a gradual speed ratio variation, preferably from zero to maximum, and controlled automatically by a condition existing in the mechanism, as for example the variations in speed and torque between a driven element and a driving element.

While the foregoing explains briefly the nature of the invention other objects and advantages not herein specifically referred to will be readily appreciated upon a full comprehension of the novel features presented in the construction, arrangement and manner of operation of the transmission.

In order that the invention may be readily understood an embodiment of the same is set forth in the accompanying drawings and in the following detailed description.

It is understood that those skilled in the art may make various changes in the construction and arrangement of the parts without departing from the spirit and scope of the invention as defined in the subjoined claims, and we therefore do not wish to be restricted to the precise construction contained herein.

In the drawings:

Figure 1 is a horizontal section taken on the line 1—1, Figure 2.

Figure 2 is vertical section on the line 2—2, Figure 1.

Figure 3 is a detail view in side elevation of the mechanically operated mechanism for controlling the rotation of the planet spider or carrier, the view being taken on the line 3—3, Figure 1, looking in the direction of the arrows.

Figure 4 is a view in elevation taken on the line 4—4, Figure 1, showing the flexible connection between the fly wheel and the sun gear sleeve.

Figure 5 is a detail view of one of the spring devices and the weight which cooperates therewith for developing a retarding effect in the planetating movement of the mechanism, and Fig. 6 is a detail view in plan of the head and camming member carried thereby for actuating the brake shoe levers.

Referring now to the drawings in detail: 5 represents the driving shaft which is made with stepped diameters, 6 and 7 adjacent its power input, and the larger one of these diameters serving as a bearing surface in the opening 8 of the housing 9 which encloses the operating mechanism of the transmission. The smaller one of the diameters cooperates with a packing gland or the like 10, to prevent the escape of oil from the housing through the shaft opening.

Fixed on the end of the larger diameter 6 of the driving shaft is a relatively large radial flange 11 which is connected in fixed relation with the fly-wheel 12 by means of bolts 13. The webbed portion of the fly wheel 12 against which the radial flange 11 is clamped by the bolts 13, also serves as a bearing surface for the ring plate 14 which is clamped by means of the bolts 13 and provided with an offset 15 to leave an annular recess for accommodating the flexible connection 16.

The flexible connection is best illustrated in Figure 4 and from which it will be noted that the ring member 17 which is splined as at 18 on the sun gear sleeve 19, is made with spaced radial projections 20. These projections provide a series of spaces or recesses 21 in each of which is accommodated a pair of coil springs 22. One end of these springs bears against the radial projections 20 and the opposite ends bear against an intermediate block 23 which is secured to the web of the fly wheel by means of rivets, pins, or the like 24.

In this way the drive from the driving shaft 5 through the fly wheel and to the sleeve 19 of the sun gear is made through the springs 22 and the springs serve to absorb all pulsating frequencies in the drive and eliminate such irregularities in the transmission.

It will also be observed from the foregoing description that the mechanism, at least in its preferred form as illustrated, contemplates a sun gear drive. The driven shaft 25 enters the housing 9 through an opening in the opposite side and extends substantially through the housing and is supported in an axial bore in the enlarged diameter at the end of the driving shaft 5. The driving shaft thus supports the end of the driven shaft and to reduce friction to a minimum a roller bearing 26 is employed to cooperate with the reduced diameter 27 of the driven shaft. The driven shaft where it enters the housing 9 is also quipped with a ball bearing 28 as illustrated.

The sun gear sleeve 19 extends forwardly and carries at the end thereof the sun gear 29 which is mounted with freedom of rotation on the driven shaft with a bushing 30. Meshing with the sun gear 29 is a series of planet gears 31 which are also in constant mesh with the teeth 32 of a ring gear 33.

The ring gear 33 is made with a sleeve 34 which is splined or otherwise fixed to the driven shaft.

It will thus be seen that the power input on the sun gear will be transmitted through the ring gear and then to the driven shaft with a multiplication of torque and low speeds are thus effectively transmitted from the driving shaft to the driven shaft.

Mounted on one side of the sun gear 29 with freedom of rotation on the sleeve 19 is one part 35 of a planet spider or carrier, and on the other side of the sun gear 29 is another part 36 of the spider or carrier. Part 36 is journaled with freedom of rotation on the ring gear sleeve 34. Suitable bushings may be employed for both mountings for these spider parts. The spider or carrier parts 35 and 36 are made with journal bearings 37 and 38 for a series of planet shafts 39. These shafts are mounted with freedom of rotation in the journal bearings thus provided and the planet gears 31 are fixed to rotate therewith.

The opposite ends of the planet shafts 39 carry cams 40 and the cams are fixed to rotate with the shafts. Projecting outwardly from the sides of the parts 35 and 36 of the spider or carrier are ears 41, each of which have an opening therethrough through which the push rods 42 extend, and the push rods carry rollers 43 on their projecting ends.

It will thus be seen that rotation of the planet gears 31 will impart rotation in the same direction to the planet shafts 39 which will also rotate cams 40 with the rollers 43 on the push rods having a wiping contact with the cams. The push rods are therefore thrust outwardly whenever the rollers are riding on the camming surface of the cams.

Fixed to the sides of the carriers or spider parts 35 and 36 are guide blocks 44 through which the opposite ends of the push rods project. Intermediate the guide blocks 44 and the ears 41 for each rod is a sliding block 45 against which one end of the coil springs 46 abut. The opposite ends of the springs 46 are held against a radial flange washer or the like 47, adjacent the ears 41. Pivotally mounted to the sliding blocks 45 by means of a pin or the like 48, are links 49, the opposite ends of which being pivoted as at 50 to the tail pieces 51 of the centrifugal weights 52. The weights are also pivoted as at 53 to the parts 35 and 36 of the carriers.

The purpose and operation of the resilient resistance device in the cooperation of the weights provides a convenient and practical method of developing a retarding effect in the planetating movement of the mechanism so as to automatically control the change speed gear from a speed ratio into a one to one or unit drive or vice versa. The theory of operation of the mechanism in this respect will be more fully hereinafter explained.

The part 35 of the spider or carrier is provided with a sleeve which has a radially projecting flange 54 to which is secured by rivets, bolts, or the like 55, a ring member 56 which carries a friction plate 57. Plate 57 is employed as a braking surface for arresting rotation of the spider or carrier so as to establish a reverse drive through the mechanism. In other words, by arresting the rotation of the spider the ring gear will be caused to rotate in an opposite direction and since it is fixed to the driven shaft, this shaft will also rotate in an opposite direction. It is of course understood that a reverse drive through the mechanism is established only with a speed ratio and is not required to be accomplished in a one to one drive.

The reverse control is manually operated by means of a control rod 58 which is operated by a lever or any means suitable for the purpose positioned conveniently accessible to the driver. This rod 58 enters the housing 9 as at 59 and has on the end thereof a head 60 so that rotation of the rod will also rotate the head 60 and cause the friction shoes or clamping segments 61 to move into clamping relation with the friction plate 57 and arrest its rotation. Since it is in fixed relation to the spider or carrier, the latter will also be arrested and the drive reversed as above explained.

The shoes 61 are actuated by the parallel links or levers 62 which are fulcrumed as at 63 intermediate their ends. The links are further pivotally connected as at 64 to the shoes and with their fulcrumed ends terminating in heads 65, each of which having a nose piece 66. The head 60 has up-standing shoulders 67 offset to one another and with the nose pieces of the heads 65 bearing against a floating camming member 68 which is confined on the head between the offset shoulders 67.

Springs 69 are employed to normally retain the heads 65 against the cam member 68 with the shoes 61 out of clamping relation with the friction plate. This construction of the camming head enables rotation of the rod 58 to move both shoes 61 into clamping engagement with the friction plate with an equalized pressure. In other words, the pressure of both shoes will be equal on opposite sides of the plate. This is, of course, a desirable feature since it prevents one shoe from assuming more friction than the other, and also develops a more positive locking engagement with the plate.

For convenience in explaining the fundamental principles of the automatic operation of the mechanism, the same will be considered as used in connection with a motor vehicle. In the first place, the cams in the retarding mechanism are directly associated with the planetating gears and the cams in this respect are timed so that the weights will operate in synchronism.

In Figure 2, two phantom outlines of the retarding mechanism are shown to indicate generally the positions that the weights assume when in operation. As an example, the position "A" shows the weights at the limit of their inner positions and the positions which they will assume when the mechanism is at rest, and even when the driving shaft is rotating at a very slow rate of speed.

When the driving shaft is rotated at a predetermined low rate of speed, the weights will remain in their inner position, primarily for the reason that the centrifugal force is not sufficient to throw them out, especially when it is considered that they must move outwardly against the resistance offered by the tension of the springs. At such low rates of speed the cams have a wiping contact with the rollers on the push rods and the push rods are thus subject to limited reciprocation, but as soon as the weights are in their inner positions and the springs are under a minimum tension due to the position of the sliding blocks on the push rods, the resistance to the reciprocation of the push rods is at a minimum. Increased speed of the driving shaft, however, will operate to move the weights outwardly, which will increase the tension of the coil springs and develop an increased resistance to the reciprocation of the push rods.

This will begin to develop a retarding effect in the planetating movement of the mechanism since increased energy stored in the springs will require more energy to reciprocate the push rods and this energy stored in the springs by the position of the weights in their outward positions, will continue to increase the speed of the driven shaft until the tension of the springs has been increased to an extent as to develop such a tooth pressure between the planet gears and the ring gear that they will stop and thus establish a one to one drive.

The increase in tension developed in the springs will be transmitted as tooth pressure between the planet gears and the ring gear so that as this tension of the springs is gradually increased, the ring gear will be gradually speeded up.

The mechanism has been developed for the purpose of producing a gear change construction possessing the features of nontransmission of power when the drive shaft is rotating at a slow speed. When the driving shaft is increased in speed the driven shaft is caused to rotate with a variable drive at a decreased speed and with a multiplication of torque, and when the torques of the driving and driven shafts are substantially balanced, a unit drive is effected.

A further feature is the limitation of maximum torque which the drive shaft may transmit through the mechanism in a unit drive, and if more torque is produced by the driving unit than that which has been predetermined, the mechanism operates at a variable speed with increased torque to the driven member.

We desire to make it perfectly clear that the weights do not have to assume their outermost positions before a one to one drive is established, and believe that the above explanation makes this perfectly obvious.

Assuming that the weights have been moved by centrifugal force out of their inner positions and the speed of the driving shaft is retained temporarily constant, the reciprocation of the push rods will oscillate the weights so long as the centrifugal force of the weights is insufficient to overcome the maximum tension of the springs. It is even possible, under certain conditions, that the weights will oscillate to a limited extent even when the mechanism is in a one to one drive.

Another explanation might be mentioned that as a result of the reciprocation of the push rods against the resistance offered by the springs, the weights cooperate to increase the resistance of the springs and thus increase the retarding effect for establishing a unitary drive.

It should be further observed that the retarding effect developed in the planetating movement of the mechanism is established throughout nearly 360° of the cycle of rotation of the planetating gears.

The particular design of the cams is also an important feature, and in this connection, it should be noted that the effect on the push rods changes from a maximum to a minimum pressure in short timed intervals and as close to an instantaneous action as the action of the springs permits. Then again, since the rollers of the push rods are in constant wiping contact with the cams, the operation is practically noiseless.

Having thus described and shown an embodiment of our invention, what we claim and desire to secure by Letters Patent of the United States is:

1. In a transmission, driving and driven shafts, planetary change speed mechanism connecting said shafts comprising, a sun gear, means for connecting said sun gear in driving relation with the driving shaft, a ring gear connected in driving relation with the driven shaft, a plurality of planet gears meshing with said sun gear and said ring gear, and means for automatically controlling said mechanism comprising a spring resistance device directly associated with said planetating gears and speed responsive means for varying the resistance in said device.

2. In a transmission, driving and driven shafts, planetary change speed mechanism connecting said shafts, comprising a sun gear, means for connecting said sun gear with said driving shaft, a ring gear connected in driving relation with the driven shaft, a plurality of planetating gears meshing with said sun gear and with said ring gear, and means for automatically controlling said mechanism comprising, cams rotatable with said planetary gears, spring devices actuated by said cams, and speed responsive means for varying the resistance of said spring devices.

3. In a transmission, driving and driven shafts, planetary change speed mechanism connecting said shafts, comprising a sun gear, means for connecting said sun gear with said driving shaft, a ring gear connected in driving relation with the driven shaft, a plurality of planetating gears meshing with said sun gear and with said ring gear, and means for automatically controlling said mechanism comprising, cams rotatable with said planetary gears, spring devices actuated by said cams, and speed responsive mean for varying the resistance of said spring devices, comprising oscillating centrifugal weights, links pivotally connected to said weights with their opposite ends slidably mounted on said spring devices.

4. In a transmission, driving and driven shafts, planetary change speed mechanism connecting said shafts, comprising a housing, a fly wheel for the driving shaft in the housing, a sun gear, a flexible driving connection between said fly wheel and said sun gear, a ring gear on the driven shaft, planetating gears meshing with said sun gear and with said ring gear, means for automatically controlling said mechanism comprising a resilient resistance device operatively associated with the planetating gears, speed responsive means for varying the resistance in said device and means for reversing the drive in said mechanism.

5. In a transmission, driving and driven shafts, planetary change speed mechanism connecting said shafts comprising a sun gear, means for connecting said sun gear in driving relation with said driving shaft, a ring gear on the driven shaft, planetating gears meshing with said sun gear and said ring gear, planetating shafts for said planetating gears, a revolving carrier for said planetating shafts, means for automatically controlling said mechanism comprising, a resilient resistance device, speed responsive means for varying the resistance in said device and manually controlled means for arresting the rotation of the planet shaft carriers for reversing the drive in said mechanism, comprising a revolving friction plate, friction shoes mounted on opposite sides of said plate, and a camming device for moving said shoes in clamping engagement with said friction plate.

6. In a transmission, driving and driven shafts, planetary change speed mechanism connecting said shafts comprising a sun gear, means for connecting said sun gear in driving relation with said driving shaft, a ring gear on the driven shaft, planetating gears meshing with said sun gear and said ring gear, planetating shafts for said planetating gears, a revolving carrier for said planetating shafts, means for automatically controlling said mechanism comprising, a resilient resistance device, speed responsive means for varying the resistance in said device and manually controlled means for arresting the rotation of the planet shaft carriers for reversing the drive in said mechanism, comprising a revolving friction plate, friction shoes mounted on opposite sides of said plate, and a camming device for moving said shoes in clamping engagement with said friction plate with equalization of clamping pressure on opposite sides of the plate.

7. In a transmission, driving and driven shafts, planetary change speed mechanism connecting said shafts comprising, a sun gear, a flexible connection for connecting said sun gear in driving relation with said driving shaft, a ring gear on the driven shaft, planetating shafts for said planetating gears, a revolving carrier on opposite sides of said sun gear for said planetating shafts, and means for automatically controlling said mechanism, comprising, two sets of resilient resistance devices disposed on opposite sides of the sun gear, speed responsive means for varying the resistance in said devices and manually controlled means for arresting the rotation of the planet shaft carriers for reversing the drive in said mechanism, comprising a revolving friction plate, friction shoes mounted on opposite sides of said plate, and a camming device for clamping said shoes in clamping engagement with said friction plate with equalization of clamping pressure on opposite sides of the plate.

8. In a transmission, driving and driven shafts, planetary change speed mechanism for connecting said shafts in different speed ratios, a sun gear and a ring gear in said mechanism, a planet gear meshing with said sun gear and said ring gear and means for automatically changing the speed ratio, comprising in combination a centrifugal weight influenced spring tension device and a cam motion between said spring tension device and said planet gear.

9. In a transmission, driving and driven shafts, planetary change speed mechanism for connecting said shafts in different speed ratios, a sun gear and a ring gear in said mechanism, planet gears meshing with said sun gear and said ring gear, a planet carrier for said planet gears and means for automatically changing the speed ratio, comprising in combination centrifugal weight influenced spring tension devices mounted on said planet carrier, planet shafts for said planet gears mounted in said planet carrier, cams carried by said planet shafts, and rods in said centrifugal weight influenced spring tension devices having a wiping contact with said cams.

10. In a transmission, driving and driven shafts, planetary change speed mechanism for connecting said shafts in different speed ratios, a sun gear and a ring gear in said mechanism, planet gears meshing with said sun gear and said ring gear, a two part planet carrier for said planet gears, one part of said planet carrier being disposed on one side of the planet gears and the other part thereof being disposed on the opposite side of the planet gears, planet shafts mounted to rotate with said planet gears and journaled in said planet carrier and means for automatically changing the speed ratio, comprising in combination centrifugal weight influenced spring tension devices mounted on the two parts of the planet carrier, draw rods in said devices and cams mounted on the opposite ends of the planet shafts having a wiping contact with said draw rods.

11. In a transmission, coaxially aligned driving and driven shafts, planetary speed changing mechanism connecting said shafts in automatically variable driving ratios, a planet gear functioning as an element in said mechanism and through which both forward and reverse driving speeds are imparted from the driving shaft to the driven shaft, means for reversing the drive in said mechanism, means for automatically changing the driving ratio, comprising in combination, a cam control resilient resistance device for retarding the rotation of said planet gear about its own axis and speed responsive means for varying the effectiveness of said resilient resistance device.

12. In a transmission, coaxially aligned driving and driven shafts, planetary speed changing mechanism connecting said shafts in automatically variable driving ratios, a planet gear functioning as an element in said mechanism and through which both forward and reverse driving speeds are imparted from the driving shaft to the driven shaft, means for reversing the drive in said mechanism, means for automatically changing the driving ratio, comprising in combination, a cam control resilient resistance device for retarding the rotation of said planet gear about its own axis and means for imposing a yielding force on said resilient resistance device for varying the effectiveness thereof.

In testimony whereof we have hereunto subscribed our names.

KENNETH E. LYMAN.
ALBERT M. LANE.